Nov. 17, 1959    W. S. SHAMBAN ET AL    2,912,712
ONE-PIECE GROMMET
Filed Oct. 31, 1955
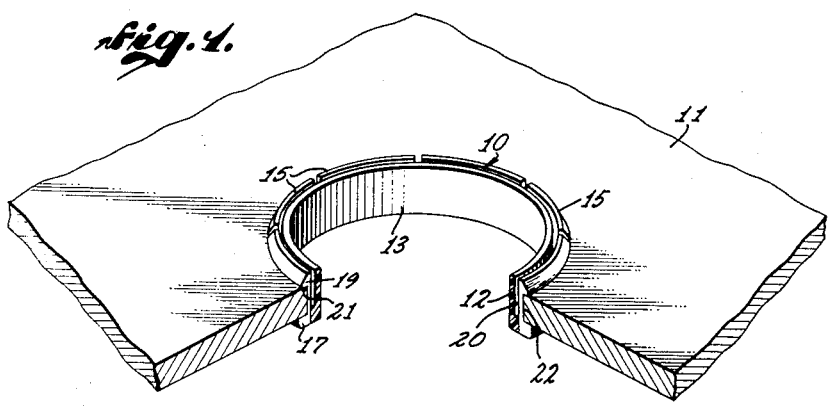
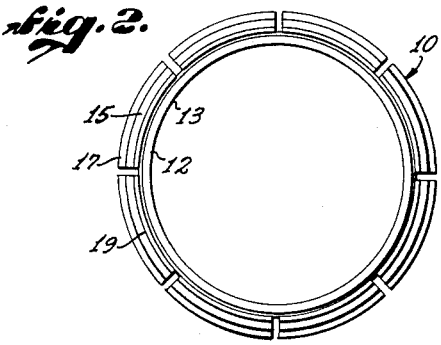
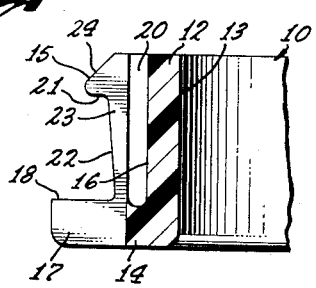
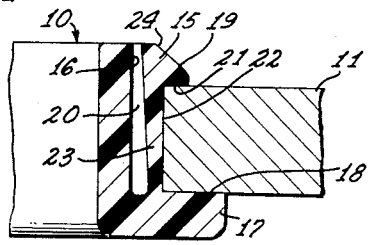
WILLIAM S. SHAMBAN,
HENRY A. TRAUB &
FRANK R. CHAFFIN,
    INVENTORS.
BY George N. Smyth
            ATTORNEY.

United States Patent Office 2,912,712
Patented Nov. 17, 1959

2,912,712
ONE-PIECE GROMMET

William S. Shamban and Henry A. Traub, Pacific Palisades, and Frank R. Chaffin, Los Angeles, Calif.

Application October 31, 1955, Serial No. 543,952

3 Claims. (Cl. 16—2)

This invention relates to grommets and particularly those adapted to be mounted in an opening in a bulkhead or the like for protecting a member or members passed through the opening.

Grommets have long been used in many industries and the use has grown particularly in aircraft and related fields for protecting lines and conduits of various types in their passage through openings in bulkheads or similar structural elements. The mounting and anchoring of the grommet in the opening of the bulkhead has been difficult, particularly if the grommet is formed of a single element. A single element or one-piece grommet is desirable for many reasons, one being that such a grommet may be mounted from one side of the bulkhead and without the necessity of work operations being performed on both sides of the bulkhead. To permit the use of one-piece grommets in such installations several expedients have been previously proposed.

In one form of the prior grommets used, the annular body element of the grommet was split to allow the grommet to be contracted radially and worked into the opening. These grommets were formed of relatively stiff, shape-retaining material and interlocked with the defining edges of the opening once the contracted end was released. A second type of one-piece grommet previously used consisted in forming the body element of the grommet of a resilient or pliant material which was easily deformed to permit the grommet to be sufficiently compressed to enter the opening and interlock with the defining edges thereof.

Where the grommet is formed of a material easily deformable to permit installation of the grommet, the grommet is subject to the inherent defect that it is also easily and often accidentally disengaged from the structural element to which it is mounted. In the split ring type of grommet, the abutting or adjoining edges of the same present relatively sharp lips which catch and abrade the surfaces of members passed through the grommet. Where vibration is present these lips can cause failures in the lines or conduits through the cutting action produced by the constant movement of the relatively sharp lips over the lines or conduit.

In the grommet of the present invention, although the passage of the grommet is defined by an unbroken cylindrical surface, the grommet is nevertheless very easily mounted within an opening in the bulkhead or the like and from the one side thereof. The mounting of the grommet is effected through the interlocking engagement of a plurality of circumferentially arranged resilient fingers circumscribing the passage-forming element and integrally joined therewith. The fingers are arranged concentric with the passage-forming element of the grommet and are radially spaced outwardly of the element. This structural arrangement not only facilitates the mounting of the grommet, but also permits some movement of the passage forming-element relative to the bulkhead. The grommet thus inherently acts to absorb shock and vibration forces generated in the line or conduit passed through the grommet.

As the circumferentially arranged resilient fingers are radially spaced outward from the passage forming element, these fingers may be radially deflected inwardly to permit their passage through the opening in the bulkhead and are so formed as to interlockingly engage with the defining edges of the opening once the fingers have been moved through the opening. The fingers, once they have interlockingly engaged with the defining edges of the opening, act to securely mount the grommet within the opening. Furthermore, as the fingers form no part of the passage forming element of the grommet they do not present any edges or like configurations to abrade or damage the member or members passed through the grommet.

Other features and advantages of the present invention will be hereinafter apparent from the following description, particularly when taken in connection with the accompanying drawing, in which Figure 1 is a perspective view, partly in section, showing a grommet of the present invention mounted in an opening formed in a bulkhead or wall-like element;

Figure 2 is a plan view of the grommet;

Figure 3 is a fragmentary view in section on an enlarged scale showing the grommet separated from the bulkhead; and Figure 4 is a view similar to Figure 3, but showing the grommet interlocked with the bulkhead.

The grommet 10 of the present invention, referring now to the drawing and more particularly to Figure 1 thereof, is one primarily intended to be mounted in an opening in a bulkhead 11 or like wall element for protecting means such as a bundle of electrical conduits, a hydraulic line or the like passed through the bulkhead. In the illustrated embodiment of the grommet, the same comprises an element 12 presenting internal wall means defining an unbroken cylindrical surface 13. The cylindrical surface 13, in turn, defines the passage of the grommet and the bearing area for supporting the member or members passed through the bulkhead.

The passage-forming element 12 is integrally joined at the one end portion thereof by means of an outwardly extending web member 14 with a plurality of spaced fingers 15. The fingers 15 circumferentially extend about the passage-forming element 12 and are of a length such as to terminate at their free ends closely adjacent the one edge face 16 of the element 12. The web member 14 extends outwardly of the root portions of the fingers 15, as clearly shown in Figure 4 of the drawing, to provide an annular flange 17 presenting a shoulder 18 to facewisely engage with the one surface of the bulkhead when the grommet is mounted in the opening preformed therein. Each finger 15 is formed at the free end thereof with an out-turned rib 19 having a face 21 to be engaged with the surface of the bulkhead opposite to the surface thereof engaged by the shoulder 18 of the flange 17. In effect, it will be seen that the flange 17 and the ribs 19 coact to form an annular groove 22 circumscribing the grommet and adapted to receive the bulkhead 11.

As best seen in Figure 3, the transverse wall 23 of the groove 22 so angularly extends relative to the longitudinal axis of the element 12 that the diameter of the grommet body as measured along the wall 23, progressively decreases from the free end of the fingers 15 toward the root portions thereof. This structure, as will be later explained, brings about an important feature of the grommet of the present invention.

As the fingers 15 are spaced radially outward from the passage-forming element 12 of the grommet by an annular space 20, these fingers may be flexed inwardly to permit insertion of the grommet into the opening in the bulkhead. To facilitate the inward radial flexure of the fingers 15, the free end of each finger is formed with an outwardly facing surface 24. The surfaces 24 when brought into engagement with the defining edge of an opening, act to cam inwardly the fingers 15 as a pushing force is applied to the web member 14 of the grommet. The annular space 20 is sufficient to permit inward flexure of the free ends of the fingers to dispose the ribs 19 within the opening in the bulkhead, whereupon the grommet may be axially moved through the opening until the ribs 19 are disposed beyond the opposite face of the bulkhead. When the ribs move into this position, the fingers 15 move toward their normal or unflexed position and thus interlockingly engage with the defining edges of the opening. In the inserted position of the grommet the defining edges of the opening are mounted within the groove defined by the surface 18 of the flange 17 and the surfaces 21 of the fingers 15. With the grommet now interlockingly engaged with the defining edges of the opening, there is little likelihood of the grommet accidentally dislodging from the bulkhead. It is to be noted, however, that the grommet can be removed from the bulkhead through a tool or like element which would inwardly flex the fingers 15 to move the ribs 19 thereof inwardly of the defining edges of the opening. With the ribs moved inwardly of the edges of the opening, the grommet could be axially moved through the opening to permit separation of the grommet from the bulkhead.

It should be understood that there is a definite relationship between the diameter of the opening in the bulkhead and the size of the grommet to be mounted in the opening. Preferably, the grommet should have a diameter measured medially of the groove 22 substantially the same as the diameter of the opening. The grommet, furthermore, cannot be effectively used where the thickness of the bulkhead is greater than the width of the groove 22. Where the bulkhead has a thickness substantially the same as the width of the groove, the ribs 19, as will now be understood, aid in holding the grommet against movement relative to the bulkhead. The grommet may, however, be effectively anchored in the opening of a bulkhead having a thickness less than the width of the groove 22, in which case the ribs 19 would not be engaged with the bulkhead. Where the thickness of the bulkhead is less than the width of the groove, the grommet, when inserted into the opening, is positioned with the shoulder 18 facewisely engaged with the one surface of the bulkhead. Here it will be seen that the wall 23 acts to hold the grommet against movement axially of the opening, aided in part by the resilience of the fingers 15. This is so, for the fingers will in effect urge the angularly extending wall 23 against the one defining edge of the opening in the bulkhead and the wall act as retaining means for holding the bulkhead against the shoulder 18.

It can be seen in the drawing that since the grommet is relatively narrow in radial dimension it defines an opening that is only slightly smaller in diameter than the bulkhead opening in which the grommet is mounted. Thus, the grommet minimizes the extent to which the bulkhead must be weakened to pass a conduit of a given diameter.

The radial compactness of the grommet is accomplished by a construction which comprises, in effect, two concentric cylinder portions that are substantially axially coextensive and are interconnected at one end by a radial web, the radial web being extended outward to form a radial flange, the outer cylinder portion having finger-forming slots to make it capable of radial contraction, the radial space between the two concentric cylinder portions being sufficient, but not substantially more than sufficient, to permit the required contraction of the fingers of the outer cylinder portion for installing the grommet in a bulkhead opening.

The ribs 19 at the outer ends of the fingers form outwardly directed projections for engagement with one side of the bulkhead in which the grommet is mounted. The radial contraction of the outer cylinder portion, then, must be sufficient to permit the projections 19 to pass through the bulkhead opening and the amount of required radial contraction is determined by the difference between the radius of the peripheral surface of the projections 19 at the unrestrained configuration of the grommet. The required radial contraction of the fingers of the slotted outer cylinder portion of the grommet involves inward flexure of the fingers into the radial clearance space between the two cylinder portions, but it is important to note that the radial contraction of the grommet is not limited to the radial dimension of the clearance space because the grommet is made of resilient material. Thus, the projections 19 may be radially squeezed or deformed to thinner dimension by the forcing of the grommet into a bulkhead opening, and, in addition, the inner cylinder portion may be appreciably radially contracted by virtue of its inherent resiliency. For these reasons, the radial dimension of the clearance space 20 may actually be less than the radial dimension of the projections 19, as may be seen in Figures 3 and 4. It is the relatively small magnitude in radial dimension of the clearance space 20 that makes the radial compactness of the grommet possible.

The grommet of the present invention may be formed of a number of materials and excellent results have been obtained when the grommet was formed of the polytetrafluoroethylene resin known and sold under the trademark "Teflon." It is to be understood, however, that the grommet of the present invention may be formed of materials other than "Teflon" and in fact can be formed of other plastics or a suitable resilient metal, the grommet in the latter example being completed through machining operations which form or complete the annular space 20, as well as the axially extending grooves separating the circumferentially arranged spaced fingers 15.

Of whatever material the grommet is formed, it will be seen that the passage or bearing area defined by the cylindrical surface 13 is unbroken and thus presents no edges or lips to impede the passage of a member or members through the grommet or abrade or mar the same after mounting in the grommet. Furthermore, as the passage-forming member 12 is joined with the root portions of the fingers 15 only through the web member 14, the member 12 may move a limited extent, relative to the bulkhead once the grommet is mounted thereto. This is particularly so where the grommet if formed of a resilient material, whether plastic or metal, and the grommet will thus act to absorb shock and vibration forces generated in the member or members engaged and protected by the grommet.

Although the now preferred embodiment of the present invention has been shown and described herein, it is to be understood that the invention is not to be limited thereto, for it is susceptible to changes in form and detail within the scope of the appended claims.

We claim:

1. A one-piece grommet of resilient material adapted to be inserted through a circular aperture in a panel and to provide a smooth cylindrical passage therethrough, said grommet comprising an annular flange-like base member, said member having an inner diameter slightly less than, and an outer diameter somewhat greater than, the diameter of the aperture, a pair of coaxially disposed sleeve-like elements, said elements being integral with the base member and extending axially in the same direction substantially the same distance therefrom, the first of said elements having an inner diameter coinciding with the inner diameter of said member and an outer diameter less than the diameter of the aperture, and the second of said elements having an inner diameter greater than the outer diameter of the first element, but less than the diameter of the aperture, said second element further being shaped on its radially outer side to provide a shoulder disposed axially apart from said base member by a distance substantially equal to the thickness of the panel, the outer diameter of the portion of said second element intermediate said shoulder and said base member being approximately equal to the diameter of the aperture, the last said portion tapering conically slightly inwardly toward the base member, and the outer diameter of the annular shoulder being in excess of the diameter of the aperture, said second element further being slotted radially along a plurality of axially directed lines disposed about said second element to divide the last said element into arcuate sectors, said sectors being yieldably compressable radially inwardly to permit said second element with its projecting shoulder first to be inserted through said aperture, and then to spring radially outwardly to grasp said panel about the periphery of the aperture between said shoulder and the outermost portion of said flange-like base member.

2. A one-piece grommet of resilient material adapted to be inserted through a circular aperture in a panel and to provide a smooth cylindrical passage therethrough, said grommet comprising an annular flange-like base member, said member having an inner diameter slightly less than, and an outer diameter somewhat greater than, the diameter of the aperture, a pair of coaxially disposed sleeve-like elements, said elements being integral with the base member and the inner element extending axially in the same direction at least as far from the base member as the outer sleeve-like element, the first of said elements having an inner diameter coinciding with the inner diameter of said member and an outer diameter less than the diameter of the aperture, and the second of said elements having an inner diameter greater than the outer diameter of the first element, but less than the diameter of the aperture, said second element further being shaped on its radially outer side to provide a shoulder disposed axially apart from said base member by a distance substantially equal to the thickness of the panel, the outer diameter of the portion of said second element intermediate said shoulder and said base member being approximately equal to the diameter of the aperture, the last said portion tapering conically slightly inwardly toward the base member, and the outer diameter of the annular shoulder being in excess of the diameter of the aperture, said second element further being slotted radially along a plurality of axially directed lines disposed about said second element to divide the last said element into arcuate sectors, said sectors being yieldably compressable radially inwardly to permit said second element with its projecting shoulder first to be inserted through said aperture, and then to spring radially outwardly to grasp said panel about the periphery of the aperture between said shoulder and the outermost portion of said flange-like base member.

3. A grommet as set forth in claim 2 in which said shoulder is an abrupt shoulder for snug positive engagement with the edge of said aperture and the face of the panel around the aperture.

References Cited in the file of this patent

UNITED STATES PATENTS

| | | |
|---|---|---|
| 1,251,487 | Duck | Jan. 1, 1918 |
| 1,753,631 | Walters | Apr. 8, 1930 |
| 2,104,217 | Barnes | Jan. 4, 1938 |
| 2,141,878 | Roby | Dec. 27, 1938 |
| 2,239,255 | Shaw | Apr. 22, 1941 |
| 2,355,126 | Webster | Aug. 8, 1944 |
| 2,495,252 | Hansen | Jan. 24, 1950 |
| 2,559,759 | De Swart | July 10, 1951 |
| 2,660,759 | Davis | Dec. 1, 1953 |
| 2,700,751 | Hallerberg | Jan. 25, 1955 |